United States Patent [19]
Hirayama et al.

[11] Patent Number: 5,509,092
[45] Date of Patent: Apr. 16, 1996

[54] METHOD AND APPARATUS FOR GENERATING INFORMATION ON RECOGNIZED CHARACTERS

[75] Inventors: Yuki Hirayama, Kawasaki; Tomio Amano, Yokohama; Akio Yamashita, Urawa, all of Japan

[73] Assignee: International Business Machines Corporation, Armonk, N.Y.

[21] Appl. No.: 151,080

[22] Filed: Nov. 12, 1993

[30] Foreign Application Priority Data

Dec. 3, 1992 [JP] Japan .................................. 4-323944

[51] Int. Cl.$^6$ .................................................. G06K 9/32
[52] U.S. Cl. .......................... 382/301; 382/177; 382/181
[58] Field of Search .................................. 382/9, 44, 47, 382/57, 61, 177, 181, 185, 186, 187, 188, 189, 290, 292, 298, 301, 309, 311, 313, 314, 315; 395/150, 151

[56] References Cited

U.S. PATENT DOCUMENTS

| | | | |
|---|---|---|---|
| 4,745,561 | 5/1988 | Hirosawa et al. | 395/150 |
| 5,093,868 | 3/1992 | Tanaka et al. | 382/9 |
| 5,123,062 | 6/1992 | Sangu | 382/57 |
| 5,142,613 | 8/1992 | Morikawa et al. | 395/150 |

Primary Examiner—Leo Boudreau
Assistant Examiner—Phuoc Tran
Attorney, Agent, or Firm—Ronald L. Drumheller

[57] ABSTRACT

Characters are recognized by a conventional OCR apparatus and converted into outline font form. The system includes a recognition device for optically reading printed characters and recognizing those to obtain information on the recognized characters consisting of text code information and character layout information, an outline font table for retaining outline font data of characters, a character box enlarging function for enlarging enclosing rectangles of the recognized characters obtained by the recognition device by a ratio of an outline font character box to a black pixel component to be drawn in the character box while referring to the outline font table, and modifying the information on the recognized characters by using the enlarged enclosing rectangles as new character boxes of the outline font.

9 Claims, 8 Drawing Sheets

FIG.14(A)  bcd−efghij−309mnop-xyz

FIG.14(B)  bcd−efghij−309mnop-xyz

FIG.14(C)  bcd−efghij−309mnop-xyz

METHOD AND APPARATUS FOR GENERATING INFORMATION ON RECOGNIZED CHARACTERS

FIELD OF THE INVENTION

The present invention relates to processing of information on characters that are input through an optical character recognition (hereinafter abbreviated as "OCR") device.

BACKGROUND OF THE INVENTION

Conventional OCR systems produce an output that is just a text (character codes) of recognition results, or character strings indented by inserting spaces into a text to provide a layout resembling that of an original document. A user of the OCR system utilizes the thus-obtained information on characters for document creation by providing it to a text processing system such as a word processor or an editor.

However, in recent years, DTP (Desk Top Publishing) systems with functions upgraded from those of the word processor have spread. Possessing not only text codes, but also attributive information on character position, size, etc., these systems can handle complex information more freely than a word processor can. Therefore, in order to correspond to the DTP system, the OCR system is required to output layout information such as the positions and sizes of characters as well as the text code information.

In association with the addition of the function of outputting the layout information, it becomes necessary for the user interface of the OCR system to be able to modify not only the text code information but also the layout information. Japanese PUPA No. 63-216187 describes a system, which outputs recognized characters so that they are positioned and sized in a similar manner to an original image. However, this system is intended to modify only the recognition results of the text codes, not layout information. Further, that invention does not in any way disclose a method for enlarging or reducing recognized characters to the size of character images.

PROBLEMS WITH THE PRIOR ART

The following problems arise when it is intended to read a text on a printed document as recognition object by the OCR system, and output, without modification, the character code data, positional information, and size information of the recognized text to a DTP system or the like that uses the outline font, and utilize said output.

For example, when characters as shown in FIG. 15(A) are printed on a document as a recognition object, the OCR system recognizes rectangles that circumscribe the respective characters in the manner as shown in FIG. 15(B), and retains positional information and size information of the respective characters as enclosing rectangles as shown in FIG. 15(C). If the OCR system provides these pieces of information to the DTP system without subjecting those to any particular processing, the DTP system draws characters according to the outline font while recognizing the enclosing rectangles as character boxes (see FIG. 15(D)). As a result, various problems occur as seen from FIG. 15(E): the sizes of the characters are reduced from those on the original printed document, the base lines of the characters do not coincide with each other, the individual characters become disordered as data, and the sizes of the characters differ from each other.

OBJECTS OF THE INVENTION

As the present invention has been made in view of the above circumstances in the prior art, it has as its object the processing of character information as characters identical or similar to their original image in a DTP system, etc. from information regarding characters obtained through an OCR system.

SUMMARY OF THE INVENTION

In a method for generating information on recognized characters according to the present invention, enclosing rectangles of characters that are obtained by the optical recognition of printed characters and are enlarged by a factor of the ratio of the outline font character box to a black pixel component to be drawn in the character box, and information on the recognized characters is generated by using the enlarged enclosing rectangles as new outline font character boxes. As a result, the drawing of characters at sizes smaller than the original ones can be avoided during drawing based on the information generated according to the outline font.

BRIEF DESCRIPTION OF THE DRAWINGS

FIG. 11 shows status of a text.

DESCRIPTION OF SYMBOLS

Figure 1:
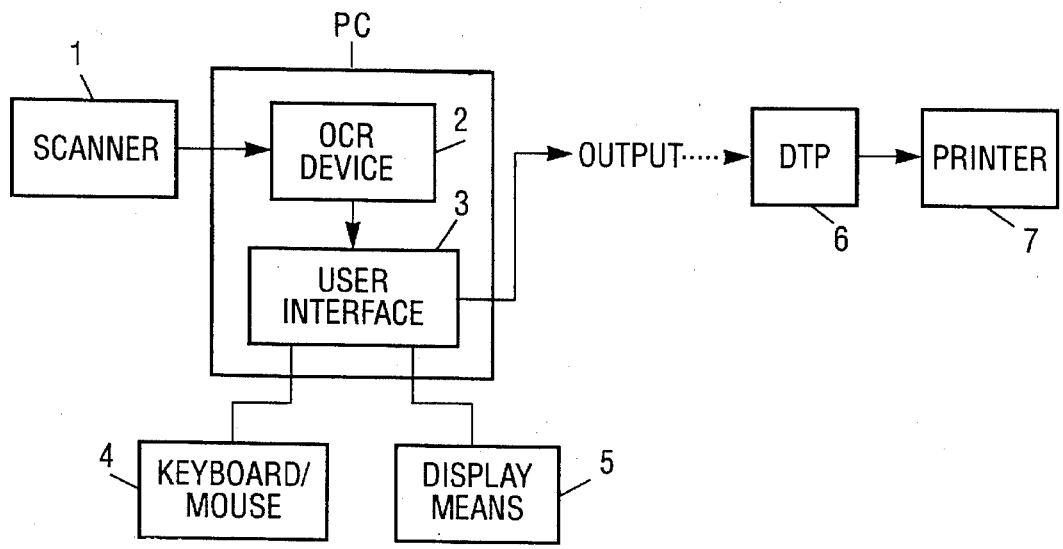
FIG. 1 is a block diagram showing the entire configuration of the system.

1 . . . Scanner
2 . . . OCR device
3 . . . User interface
4 . . . Input means
5 . . . Display means
6 . . . DTP system
7 . . . Printer
31 . . . Character box enlargement means
32 . . . Character string modification means
34 . . . Outline font table
321 . . . Character determining/marking means
322 . . . Equal allocation means
323 . . . Character information modifying means

DETAILED DESCRIPTION OF THE INVENTION

According to the invention, not only the character code information but also the layout information of each character recognized by the OCR system can be generated, and the layout information is that which has been subjected to processing to provide characters that will be close to the original ones when drawn according to the outline font. Therefore, data can be generated which can be effectively utilized by the DTP system or the like, to improve the efficiency of document production, editing, etc. Also, since the text character string can be divided into definite grouped units, processing such as modification can be performed on a grouped unit basis, which will contribute to the improvement of modification and editing work. Furthermore, a user interface can be realized in which an operator can efficiently modify attribute information such as the position, size, and font of a character.

In the method of generating information on recognized characters according to the invention, the processing capability is further improved as it becomes possible to handle discrete groups of separated character strings in editing processes, etc., through determination of the breaks within a recognized character string, the equal allocation of character box widths by the number of characters between said breaks, the modification of character box data of said enlarged enclosing rectangles by the widths of the character boxes obtained by said equal allocation, thus creating information relating to the recognized characters.

To realize the above method, the apparatus for generating information on recognized characters according to the invention comprises a recognition means for optically capturing printed characters and recognizing those to obtain information on the recognized characters having text code information and character layout information, an outline font table for retaining outline font data of characters, and a character box enlarging means for enlarging enclosing rectangles of the recognized characters obtained by the recognition means by a ratio of an outline font character box to a black pixel component to be drawn in the character box while referring to the outline font table, and modifying the information on the recognized characters by using the enlarged enclosing rectangles as new outline font character boxes data.

The apparatus for generating information on recognized characters according to the invention further comprises means for performing the determination of breaks in a recognized character string, and means for modifying data of the character boxes of the enlarged enclosing rectangles to data by the widths of character boxes obtained by the equal allocation of character boxes by the number of characters located between the breaks.

The apparatus for generating information on recognized characters according to the invention further comprises means for inputting the instructions of an operator specifying a break position, to enable correction of an error made by the system.

The apparatus for generating information on recognized characters according to the invention further comprises, for convenience of operation by the operator, display means for displaying, on the same screen, a window in which an optically captured character string image is displayed, a window in which a character string recognized and drawn according to the outline font is displayed, and a window indicating which portion of a text the character string being displayed in said windows belongs to.

FIG. 1 shows an outline of the configuration of the entire system according to an embodiment of this invention.

The system comprises a scanner 1 for optically capturing a text on a printed document etc., an OCR device 2 for recognizing text characters thus read, a user interface 3 for performing such processing as modification of the data of the recognized characters, input means 4 such as a keyboard or a mouse for inputting instructions such as ones for the above modifications, and a display means 5 consisting of a CRT or the like for displaying the text to be recognized and processed.

An output of the user interface 3 is input to a DTP system 6 and then output to a printer 7. The OCR device 2 and the user interface 3 are implemented as a personal computer having a CPU and necessary memory means.

Figure 2:
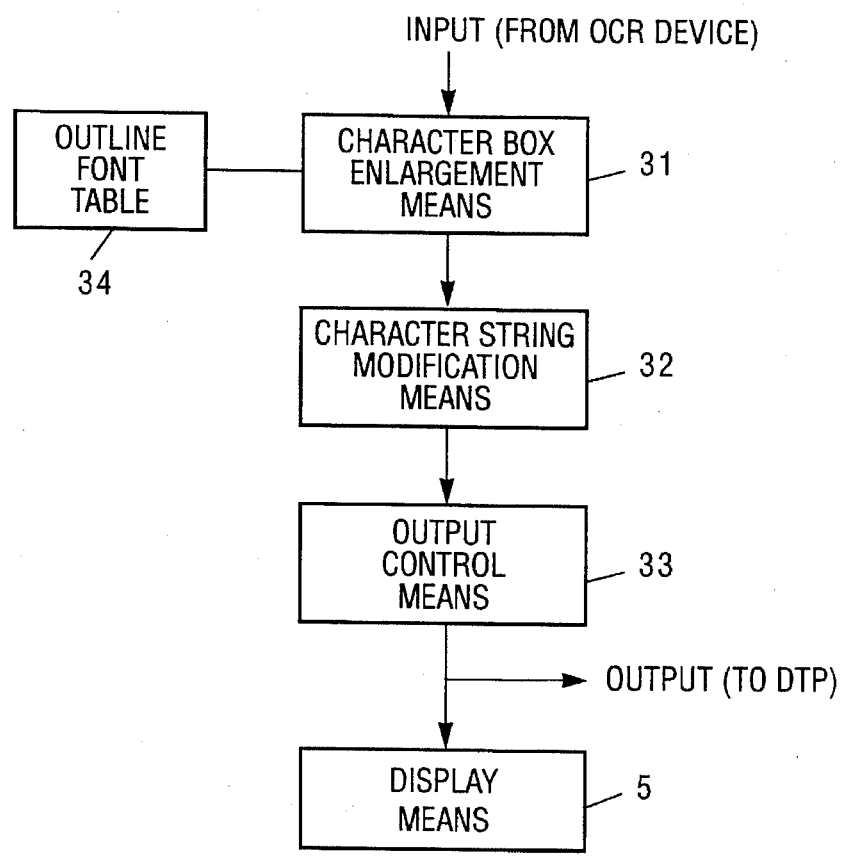
FIG. 2 is a block diagram showing configuration of a user interface.

FIG. 2 shows the detailed configuration of the user interface 3.

Figure 12:
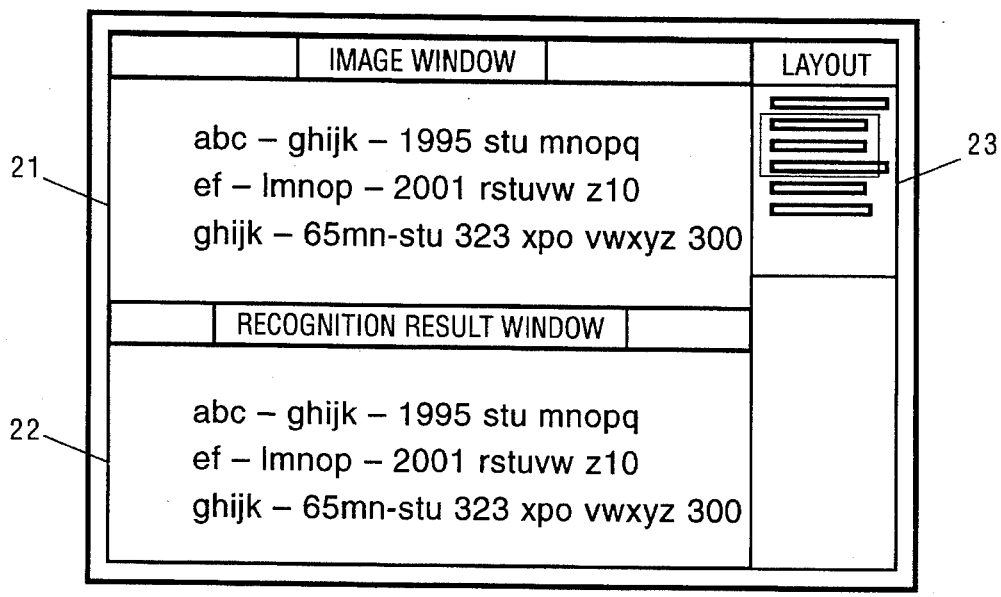
FIG. 12 shows a displayed picture.

A character box enlarging means 31 of the user interface 3 modifies outline font information of each character that is retained by an outline font table 34 so as to enlarge its character box. A character string modifying means 32 modifies a text character string. As shown in FIG. 12, an output control means 33 controls the display means 5 so that the display means 5 displays, in respective windows, an image 21 of text character strings as captured by the scanner 1, text character strings 22 that are recognition results subjected to predetermined modifications, and a layout 23 indicating which portion of the entire page is currently displayed. Furthermore, the output control means 33 provides the DTP system 6 with information on the modified text character strings (text code information and layout information).

The outline font information retained by the outline font table 34 for each character includes a character code, height-to-width ratio data relating to the size of a character box, positional coordinate data of a black pixel component to be drawn in the character box, font shape data, etc. The size of a character actually drawn is determined by setting the data relating to the character box size at values that specify a certain size.

Figure 3:
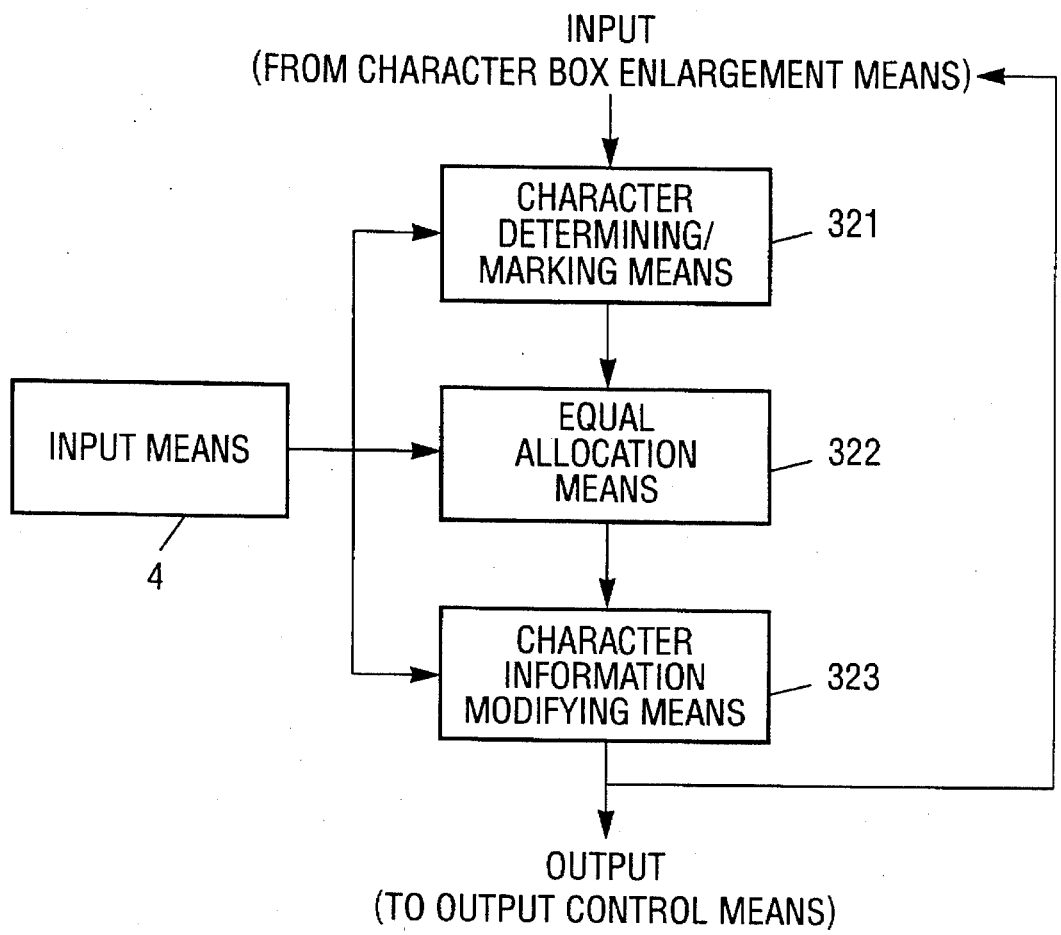
FIG. 3 is a block diagram showing configuration of a character string modifying means.

FIG. 3 shows the detailed configuration of the character string modifying means 32.

A character determining/marking means 321 of the character string modifying means 32 performs determination of a change of character type (courier, numeral, italic, bold, etc.) in a text character string, and applies a mark to the position of the change. An equal allocation means 322 equally allocates, to characters of a section of a text character string divided by the marks, respective widths that are obtained by dividing the length of the section by the number of characters belonging to the section. A character information modifying means 323 modifies the attributes (character code, font, etc.) other than those to be modified by the means 321 and 322. Each means can receive instructions from the input means 4 to accept a user's modification instructions.

The operation of the above system is described below with reference to the flowchart in FIG. 4.

First, a document as a recognition target is scanned by the scanner 1 to read a text (step S1), and the scanner 1 provides black-and-white binary image data of the text to the OCR device 2. The OCR device 2 analyzes the image data and carries out recognition of the characters (step S2), and provides information on each character to the user interface 3.

Figure 5:
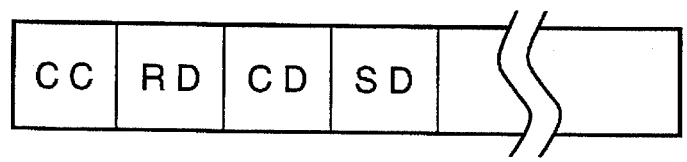
FIG. 5 is a conceptual diagram showing a data structure.

As shown in FIG. 5, the information thus-obtained on each character of the text consists of a character code CC, data RD relating to the size of a character box of the outline font, positional coordinate data CD of the black pixel component in the character box, shape data SD of the outline font, etc.

The above structure of the information on each character is employed to accommodate the outline font. When the outline font is used, a character of a predetermined font shape is drawn at a predetermined position in a character box of a predetermined size.

Figure 6:
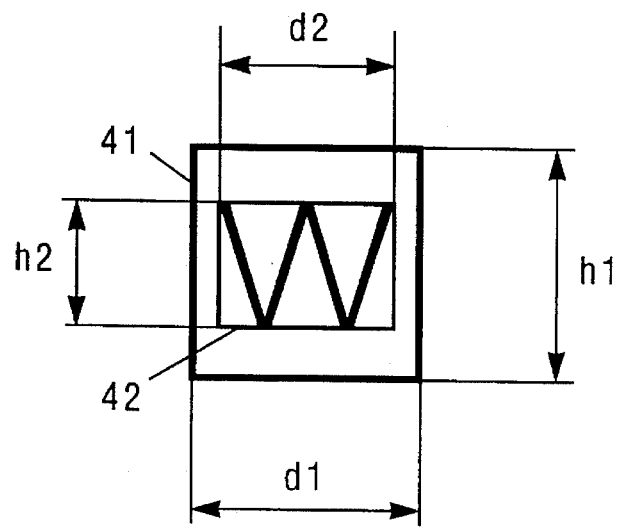
FIG. 6 is a conceptual diagram illustrating enlargement of a character box.

As shown in FIG. 6, the data RD has values obtained by multiplying the height and width of a rectangle that circumscribes a recognized character by ratios h1/h2 and d1/d2, respectively, where h1 and d1 are the height and width of a character box 41 of the outline font, and h2 and d2 are the height and width of a character (e.g., "W") to be drawn according to the outline font. The values of the data RD are used later as the height and width of a new character box when a character is actually drawn according to the outline font. Thus, the size of the character to be drawn is determined. The data CD determines the position of the character to be drawn. The information on each character consists of the data RD and CD that serve as the layout information relating to the position and size of the character, and the data CC relating the text code information.

The information on characters as input to the user interface 3 is first processed in the character box enlarging means 31 so that the characters can be drawn according to the outline font at the same sizes as in the text image (step S3).

Figure 7:
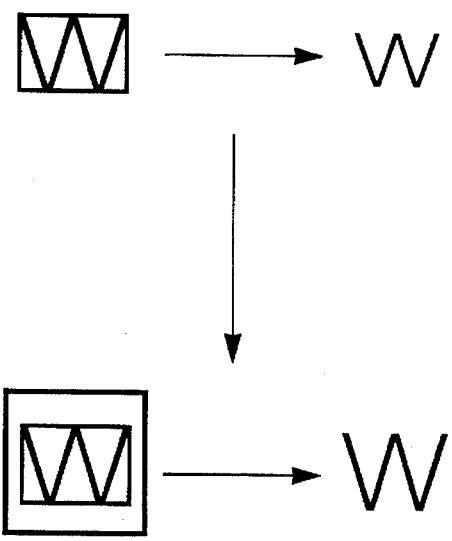
FIG. 7 is a conceptual diagram illustrating the relationship between an enclosing rectangle and a character box.

As shown in FIG. 7, when a character is drawn according to the outline font by using, as a character box, the enclosing rectangle of a character image as read by the scanner 1, a certain degree of space is interposed between the character and the box boundary, so that the character actually drawn becomes smaller than the recognized character that is associated with the enclosing rectangle. To correct for the above size reduction, that is, to draw a character having the same size as the character image even according to the outline font, the character box enlarging means 31 enlarges the height and width of the enclosing rectangle by factors of h1/h2 and d1/d2, respectively.

Figure 8:
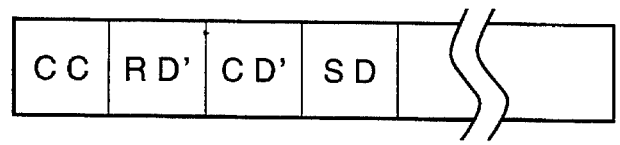
FIG. 8 is a conceptual diagram showing a data structure.

As a result of this character box enlargement processing, the information on each character is rewritten as shown in FIG. 8, in which the data RD and CD are rewritten to RD' and CD', respectively. The new information is input to the character string modifying means 32.

The character string modifying means 32 further performs processing for modifying the widths of the character boxes for each information of a discrete character string (e.g., one line or one sentence) sent from the character box enlarging means 31 (step S4).

First, the character string modifying means 32 sections a character string of, for instance, one line according to a character string dividing algorithm, and divides the total length of each sectioned character group by the number of characters belonging to the group to determine the widths of the respective character boxes. That is, the box widths of the respective characters in one character group are determined by equal division.

Figure 10:
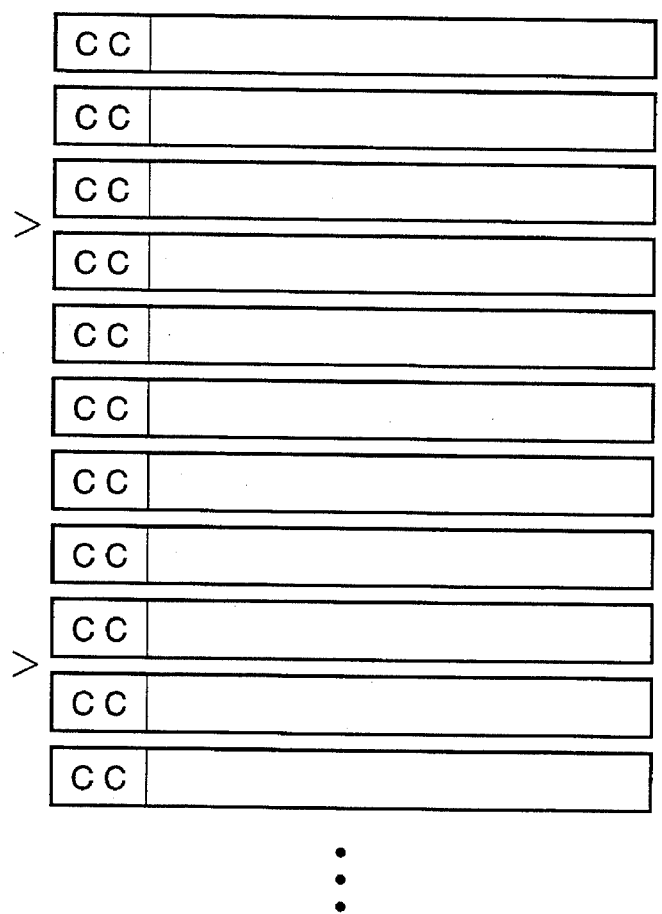
FIG. 10 is a conceptual diagram showing a list of character string data.

According to the character string dividing algorithm of the present embodiment, the character determining/marking means 321 finds and marks positions where the character type is changed (a series of courier, italic, numeral, or bold are recognized as belonging to the same group), where the character size is changed greatly, and where the two adjacent characters are widely spaced. That is, as shown in FIG. 10, the character determining/marking means 321 sections a character string by examining the character data CC, character box data RC, etc. of one-line information that is a list of respective pieces of information of a large number of characters, finding the positions of change, and inserting marking information ">" indicating a break at those positions. Then, the equal allocation means 322 determines the widths of the respective character boxes by equal allocation in which the total length of the sectioned character group is divided by the number of characters belonging to the group.

Figure 9:
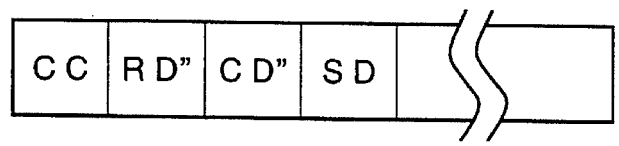
FIG. 9 is a conceptual diagram showing a data structure.

In accordance with the above process of modifying the character string, the information on each character is rewritten as shown in FIG. 9, in which the data RD' and CD' are rewritten to RD" and CD", respectively. The new information is input to the output control means 33.

In this embodiment, the base line before the division is employed as a base line of the modified character string, and the maximum height of the characters belonging to the group is employed as a height of the modified characters.

Instead of the above example, the character string dividing algorithm may be constructed based on a dynamic programming technique. In other words, a method requiring the use of a character string division cost function, and division so as to optimize the cost function. In this case, the positions of change may be determined such that the cost function takes an optimum value when the number of breaks is small, when horizontal deviations from the original enclosing rectangles are small, and when the positions of breaks are where the character type changes.

As a result of a series of the process described above, character data very close to the image as captured by the scanner 1 (see FIG. 11(A)) is utilized by the system, displayed on the display means 5 (step S5), and provided to the DTP system 6.

That is, the enclosing rectangles of the respective characters are called from the text as read by the OCR device 2 (see FIG. 11(B)), the enclosing rectangles are enlarged by the character box enlarging means 31 by the ratios h1/h2 and d1/d2 that are determined from the outline font table 34, and the characters are drawn according to the outline font using the enlarged enclosing rectangles as the new character boxes (see FIG. 11(C)). Furthermore, the character string modifying means 32 divides and modifies the character strings (see FIG. 11(D)), and provides the reshaped text to be drawn according to the outline font, which is close to the original image (see FIG. 11(E)).

As shown in FIG. 12, there appear on the screen of the display means 5 three windows 21, 22, and 23 which simultaneously display the text of the original image, the text drawn according to the outline font after the recognition results are subjected to the above processing, and a layout indicating which portion of the entire page is displayed in the image window 21 and the recognition result window 22. The three windows are linked to each other. That is, when a display in one window is moved, displays in the remaining two windows are moved accordingly to display or indicate the same portion. Therefore, a user can directly modify the recognition results by performing an operation on the recognition result window 22 by using the mouse, etc. while also watching the original image text in the image window 21.

Figure 4:
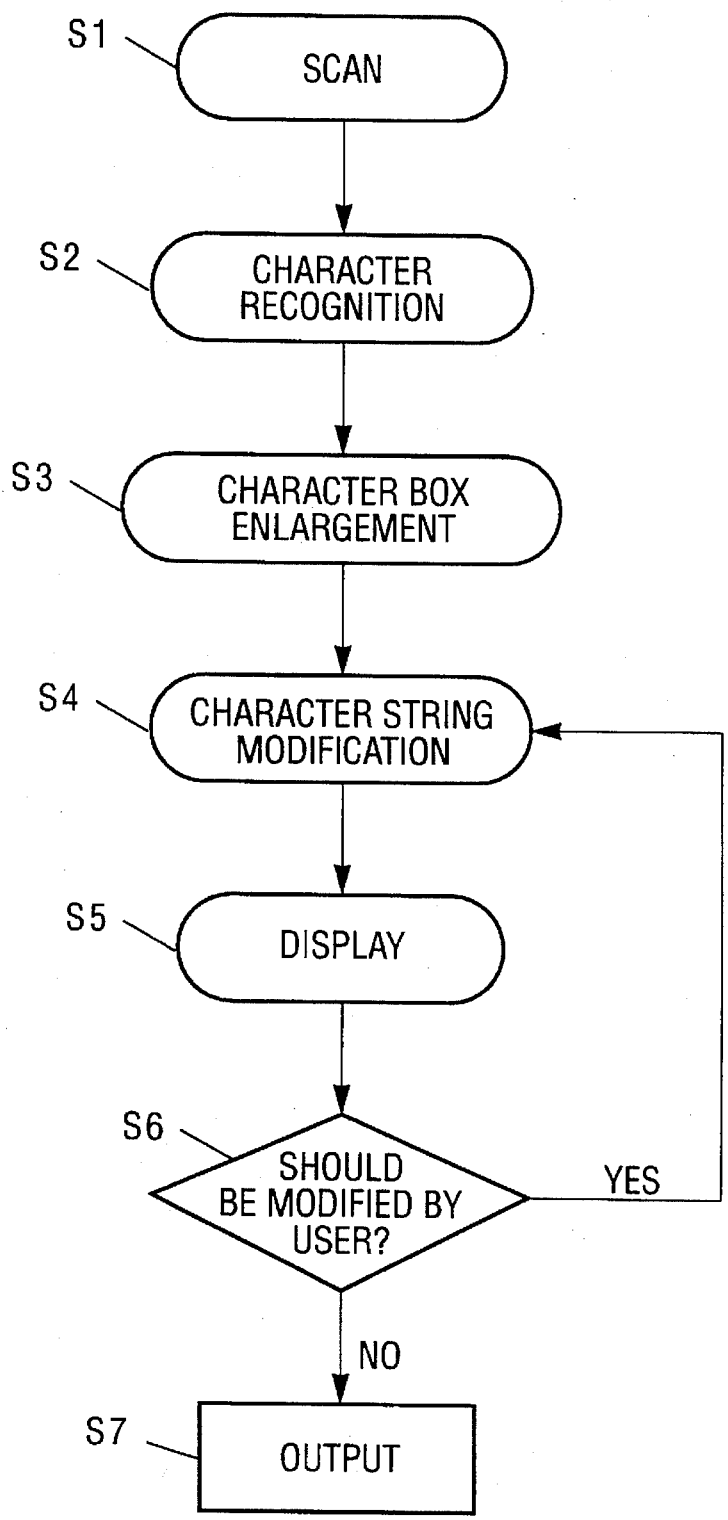
FIG. 4 is a flowchart showing the operation of the system.

Returning to the flowchart of FIG. 4, if a user wants to modify the results displayed on the display screen (step S6), the process returns to the character string modifying means 32, where necessary modifications are made based on the recognition results according to an instruction received from the input means 4.

That is, the character information modifying means 323 modifies the character code, font, or other attributes for the recognition results of each character, or for each character string divided by the character determining/marking means 321.

In addition to the above functions, the character string modifying means 32 performs, as a whole, a simple modification of a character code, display position, or size of a character based on an instruction received from the input means 4.

Figure 13B:
FIG. 13 shows status of a text.
Figure 13D:
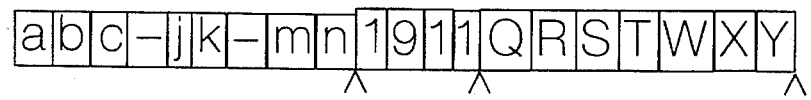

For example, when the number of recognition result characters (see FIG. 13(B)) is different from the number of characters in the original text (see FIG. 13(A)) because a character recognition routine of the OCR device 2 has erroneously recognized a break in characters (a cutting error), the operator can indicate the erroneous character string by the input means 4 and correct it (see FIG. 13(C)). The character boxes of that portion of the character string are reconstructed, and the break of the character strings is changed accordingly (see FIG. 13(D)).

Figure 14D:
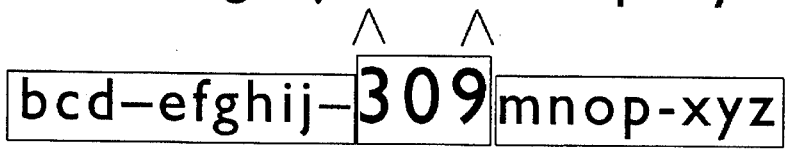
FIG. 14 shows status of a text.
Figure 15B:
FIG. 15 illustrates how characters are drawn according to the outline font.
Figure 15C:
Figure 15D:

For example, when an original text has "309" that are the only characters having a larger font (see FIG. 14(A)) but the heights of all the characters are equalized to the height of "309" to provide an incorrect display (see FIG. 14(B)) because, for the outline font display, the text has been erroneously cut into character strings, the operator can correct the positions of the breaks using the input means 4 (see FIG. 14(C)). As a result, the positions and sizes of the character boxes are calculated based on the newly designated breaks, and new character boxes are allocated to the respective characters. Thus, the characters are drawn according to the correct font sizes (see FIG. 14(D)).

The series of modification results described above are also included in the information on characters (see FIG. 9) that is provided to the DTP system 6, which can utilize the information effectively.

The modifications described above are performed by dividing a character string at breaks and marking the breaks. However, in the invention, performing only the enlargement processing on the character boxes enables the outline font drawing of characters that are close to the original ones. As long as this type of improvement is intended, the above modifying function is not indispensable.

We claim:

1. An improved method for optically reading printed characters using an optical character recognition (OCR) apparatus that represents a character as a black pixel shape within a pixel box circumscribing the black pixel shape and for inputting the OCR recognized characters to a text processing system that represents characters in outline font form in which each character is printed within a character box that is larger than a box circumscribing the character, comprising the steps of:

optically scanning and recognizing a printed character with an optical character recognition (OCR) apparatus that represents the scanned character as a black pixel shape to be recognized within a pixel box that circumscribes the black pixel shape;

the OCR apparatus generating a character code identifying the recognized black pixel shape and a size code identifying the size of the circumscribing pixel box;

determining from an outline font table an enlargement ratio for the recognized character, the enlargement ratio being a characteristic outline font parameter for the recognized character which is the ratio between a box dimension of a box that circumscribes the recognized character when printed in outline font form and the same box dimension of the character box of the recognized character when printed in outline font form; and enlarging the size code of the recognized character by the determined enlargement ratio and inputting the resulting enlarged size code as a character box size code for the recognized character to the text processing system.

2. An improved method as defined in claim 1 wherein an enlargement ratio is determined from the outline font table for each of two orthogonal box dimensions and the size code of the recognized character is enlarged by the determined enlargement ratios in both of said orthogonal dimensions.

3. An improved method as defined in claim 1 wherein a string of adjacent printed characters are scanned and recognized and the enlarged size codes for the string of characters are further modified so as to be all made equal to each other before being inputted to the text processing system.

4. Apparatus for optically reading and recognizing printed characters using an optical character recognition (OCR) apparatus that represents a character as a black pixel shape within a pixel box circumscribing the black pixel shape and for inputting the recognized characters to a text processing system that represents characters in outline font form in which each character is printed within a character box that is larger than a box circumscribing the character, comprising:

optical character recognition (OCR) apparatus for scanning and recognizing printed characters, the OCR apparatus representing a scanned character as a black pixel shape to be recognized within a pixel box that circumscribes the black pixel shape;

the OCR apparatus generating a character code identifying the recognized black pixel shape and a size code identifying the size of the circumscribing pixel box;

an outline font table for storing outline font data for characters which may be recognized by the OCR apparatus;

means for determining an enlargement ratio from the outline font table for each recognized character, the enlargement ratio being a characteristic outline font parameter for the recognized character which is the ratio between a box dimension of a box that circumscribes the recognized character when printed in outline font form and the character box of the recognized character when printed in outline font form; and means for enlarging the size code of each recognized character by the determined enlargement ratio for said recognized character and inputting said enlarged size code as a character box size code for each said recognized character to the text processing system.

5. Apparatus as defined in claim 4 wherein said means for determining an enlargement ratio determines an enlargement ratio for each recognized character from the outline font table for each of two orthogonal box dimensions and said means for enlarging the size code enlarges the size code by said determined enlargement ratios in both of said orthogonal dimensions.

6. Apparatus as defined in claim 4 wherein a string of adjacent printed characters are scanned and recognized and the enlarged size codes for the string of characters are further modified so as to be all made equal to each other.

7. Apparatus as defined in claim 4 wherein said OCR apparatus scans and recognizes printed characters on a page and also obtains for input to said text processing system information defining a character layout for said page.

8. Apparatus as defined in claim 7 and further comprising means for inputting an instruction of an operator delineating a string of characters.

9. Apparatus as defined in claim 8 and further comprising a display means for simultaneously displaying in one window a string of characters as optically captured by the OCR apparatus and in another window the same string of characters as inputted to the text processing system and in still another window layout information indicating where the captured and displayed character string is located on the page.

* * * * *